United States Patent
Haughom et al.

(10) Patent No.: US 6,880,638 B2
(45) Date of Patent: Apr. 19, 2005

(54) DEVICE FOR AN OPENING IN AN OUTER SLEEVE OF A SLEEVE VALVE AND A METHOD FOR THE ASSEMBLY OF A SLEEVE VALVE

(75) Inventors: Per Olav Haughom, Tonstad (NO); Rune Nilsen, Hundvåg (NO)

(73) Assignee: Triangle Equipment AG, Stavanger (NO)

( * ) Notice: Subject to any disclaimer, the term of this patent is extended or adjusted under 35 U.S.C. 154(b) by 0 days.

(21) Appl. No.: 10/432,599

(22) PCT Filed: Nov. 29, 2001

(86) PCT No.: PCT/NO01/00475

§ 371 (c)(1),
(2), (4) Date: Sep. 3, 2003

(87) PCT Pub. No.: WO02/46575

PCT Pub. Date: Jun. 13, 2002

(65) Prior Publication Data

US 2004/0046143 A1 Mar. 11, 2004

(30) Foreign Application Priority Data

Dec. 4, 2000 (NO) .......................................... 20006170

(51) Int. Cl.⁷ ............................. F16K 5/14; E21B 34/14
(52) U.S. Cl. ....................... 166/316; 166/330; 251/344; 251/345; 277/927
(58) Field of Search ................................ 166/316, 330, 166/332.1, 332.2, 334.1, 334.4, 373, 386, 87.1, 184, 142, 331, 167, 169; 175/243, 232, 317, 318; 251/343–345; 277/927

(56) References Cited

U.S. PATENT DOCUMENTS

| | | | |
|---|---|---|---|
| 3,581,820 A | * 6/1971 | Burns .......................... | 166/330 |
| 4,080,982 A | 3/1978 | Maezawa ..................... | 137/219 |
| 4,429,747 A | * 2/1984 | Williamson, Jr. ........... | 166/321 |
| 4,506,693 A | 3/1985 | Acker ......................... | 137/116 |
| 4,700,924 A | * 10/1987 | Nelson et al. ................ | 251/58 |
| 4,776,395 A | 10/1988 | Baker et al. ................. | 166/184 |
| 4,782,896 A | 11/1988 | Witten ......................... | 166/116 |
| 4,921,044 A | 5/1990 | Cooksey ...................... | 166/116 |
| 4,949,788 A | 8/1990 | Szarka et al. ................ | 166/285 |
| 5,263,683 A | 11/1993 | Wong .......................... | 251/145 |
| 5,316,084 A | * 5/1994 | Murray et al. ........... | 166/332.4 |
| 5,911,285 A | * 6/1999 | Stewart et al. .............. | 175/317 |
| 6,003,834 A | 12/1999 | Read ............................ | 251/30 |
| 6,044,908 A | 4/2000 | Wyatt .......................... | 166/332 |

FOREIGN PATENT DOCUMENTS

EP 0427371 A1 5/1991
GB 2201979 A 9/1988

* cited by examiner

Primary Examiner—Kenn Thompson
(74) Attorney, Agent, or Firm—Jacobson Holman PLLC

(57) ABSTRACT

A sleeve valve for fluid flow between a hydrocarbon reservoir and a well including a fixed outer sleeve with openings and a movable inner sleeve with openings which can be aligned and misaligned with the outer sleeve openings in order to admit or shut off the fluid flow. The outer sleeve opening is provided with a movable sealing element that has a through-going radial opening adapted to rest around the opening in the inner sleeve, and a tension element presses the sealing element against the inner sleeve. A portion of the side face of the sealing element forms a pressure face which under the effect of pressure in a pressure chamber presses the sealing element against the inner sleeve. The pressure chamber is via at least one connection connected to at least one pressure source whereby pressure propagation from the pressure source to the pressure chamber causes the sealing element to be pressed even more against the inner sleeve.

12 Claims, 7 Drawing Sheets

DEVICE FOR AN OPENING IN AN OUTER SLEEVE OF A SLEEVE VALVE AND A METHOD FOR THE ASSEMBLY OF A SLEEVE VALVE

This is a nationalization of PCT/NO01/00475 filed Nov. 29, 2001 and published in English.

FIELD OF THE INVENTION

The invention relates to a device for an opening in an outer sleeve which is a part of a sleeve valve for fluid flow between a hydrocarbon reservoir and a well in the hydrocarbon reservoir, where the well comprises a tubing, where the outer sleeve is fixed and forms a part of the tubing, and the sleeve valve further comprises a movable inner sleeve which by means of an actuator or a tool is movable through positions in which the outer sleeve opening is aligned or misaligned with an opening in the inner sleeve in order to admit or shut off the fluid flow.

The invention also relates to a method for the assembly of a sleeve valve comprising an outer sleeve having at least one opening equipped with a device according to the invention, where the outer sleeve and the inner sleeve are produced separately.

BACKGROUND OF THE INVENTION

In the recovery of hydrocarbons from hydrocarbon reservoirs, wells are drilled from the seabed or the earth's surface down to and into the reservoir which is under pressure. The well is lined with casing to prevent it from caving in, and placed inside the casing is a tubing that extends from the wellhead on the seabed or the earth's surface into the reservoir. The casing is perforated in the reservoir to enable hydrocarbons to flow into the casing and then into the tubing and up to the wellhead for further treatment.

A hydrocarbon reservoir may contain oil, gas and water. The production conditions, that means primarily the amount of oil, gas and water and the pressure in the reservoir, usually vary through the reservoir and alter during the course of the production time. To be able to control production from the well, that is to say control the inflow of oil, gas and water in the well, it is desirable to be able to shut off and admit the inflow to the well at different points along the tubing.

Water or gas injection is used in some places to maintain the pressure in the reservoir, that is to say that pressurised water or gas is forced into the reservoir from the well, and in that case it may be desirable to regulate the outflow from the well along the tubing.

Sleeve valves, which can be placed at suitable intervals along the well in the reservoir, can be used to control the flow to or from a well. The sleeve valves comprise an outer sleeve and an inner sleeve that are both provided with openings. The outer sleeve is fixed and forms a part of the tubing, whilst the inner sleeve is movable to align and misalign the openings in the two sleeves in order to admit or shut off flow through the sleeve valve.

The reservoir may extend across a very large area, for example, 2000 metres, and is usually divided into different production zones which may have very different pressure. The tubing extends through the different production zones, and may have one or more sleeve valves in each production zone, so as to enable hydrocarbons to be produced from one or more production zones, whilst other production zones may be closed. The production zones can be separated from one another by isolation packers that are placed between the casing and the tubing to prevent fluids from leaking between the production zones along the outside of the tubing.

If there is production from a production zone at a pressure of, for example, 200 bar, the tubing will have an internal pressure of approximately 200 bar. If the tubing passes through a production zone where the pressure is, for example, 50 bar, the sleeve valves must be closed in this production zone to prevent outflow from the well. The sleeve valves are thus subjected to a differential pressure of 150 bar between the outside of the outer sleeve and the inside of the inner sleeve.

The reverse may also happen, that is to say that there is production from a production zone having a pressure of 50 bar, and the tubing passes through a production zone where the pressure is 200 bar, where the sleeve valves in order to prevent inflow are closed. In that case, the sleeve valves are also subjected to a differential pressure of 150 bar, in a direction opposite to that of the aforementioned differential pressure.

A high differential pressure in itself can cause leakage. In addition, differential pressure can lead to deformation of the sleeve valves, which can cause the sleeve valves to leak when closed.

The problem associated with leakage of the sleeve valves because of the substantial differential pressures can be solved by using flexible gaskets of a non-metallic material. However, the temperature in the reservoir can be 100° C. or more, and the reservoir may contain constituents that corrode the gasket materials. In sleeve valves where the sealing is based on gaskets, it has been found that leakage often occurs after some time when the valve is in a closed position, and gaskets are thus not a satisfactory solution to the problem.

To avoid gaskets, valves having metal-to-metal seals have been developed. However, metal-to-metal seals have little capacity to absorb the large deformations that can be caused by substantial differential pressures, and therefore also do not provide an adequate solution to the problem of sleeve valves that leak in a closed position when subjected to substantial differential pressures.

GB 2 201 979, U.S. Pat. No. 4,782,896 and U.S. Pat. No. 4,921,044 describe sleeve valves for controlling fluid flow between a hydrocarbon reservoir and a well in the hydrocarbon reservoir, comprising a fixed outer sleeve and an inner sleeve that is movable between positions in which openings in the outer sleeve and the inner sleeve are aligned or misaligned.

SUMMARY OF THE INVENTION

The object of the invention is to provide a solution to the aforementioned problem associated with leakage of the sleeve valves when they are subjected to substantial differential pressures.

The object is attained according to the invention by means of a device for an opening in an outer sleeve that is a part of a sleeve valve and a method for the assembly of a sleeve valve of the type mentioned in the introduction which is characterised by the features disclosed in the claims.

Accordingly, the invention relates to a device for an opening in an outer sleeve which is a part of a sleeve valve for fluid flow between a hydrocarbon reservoir and a well in the hydrocarbon reservoir, where the well comprises a tubing, where the outer sleeve is fixed and forms a part of the tubing, and the sleeve valve further comprises a movable inner sleeve which by means of an actuator or a tool is movable through positions in which the outer sleeve opening is aligned or misaligned with an opening in the inner sleeve in order to admit or shut off the fluid flow.

According to the invention, the outer sleeve opening is provided with a radially movable sealing element that has a through-going radial opening that is adapted to correspond with the inner sleeve opening and has an encircling sealing surface that is adapted to rest against the inner sleeve around the inner sleeve opening. Furthermore, a tension element is disposed between corresponding bearing portions of the sealing element and the outer sleeve, and presses the sealing element with its sealing surface against the inner sleeve. In this way, a seal around the inner sleeve opening is obtained when the sleeve valve is in a closed position.

Furthermore, disposed between the side face of the sealing element and the side face of the outer sleeve opening is a pressure chamber where a portion of the side face of the sealing element forms a pressure face which under the effect of pressure in the pressure chamber presses the sealing element against the inner sleeve. The pressure chamber is via at least one connection connected to at least one pressure source, and propagation of pressure from the pressure source to the pressure chamber thus causes the sealing element with its sealing surface to be pressed even more against the inner sleeve. Thus, the force between the sealing element and the inner sleeve, which force is of major importance for the sealing of the sleeve valve, is, besides being dependent upon the force from the tension element, dependent upon the pressure in the pressure chamber.

According to the basic inventive idea, the pressure sources may be of any kind; they can, for example, consist of a supply from a hydraulic pump that is driven by the flow in the well.

In a preferred embodiment, however, one of the pressure sources consists of the pressure outside the outer sleeve. Because the pressure chamber communicates with the pressure outside the outer sleeve, the pressure outside the outer sleeve propagates to the pressure chamber where it acts on the pressure face of the sealing element and presses the sealing element against the inner sleeve, which counteracts leakage between the sealing surface of the sealing element and the inner sleeve.

In another preferred embodiment, one of the pressure sources consists of the pressure inside the inner sleeve. In the same way as described above, a high pressure inside the inner sleeve will cause the pressure to propagate to the pressure chamber and cause the sealing surface of the sealing element to be pressed against the inner sleeve.

A seal is thus obtained that is pressure-compensated or pressure-intensified; the higher the pressure outside the outer sleeve and/or within the inner sleeve, depending upon the structural solution chosen and the conditions in which the sleeve valve is used, the more forcefully the sealing surface of the sealing element is pressed against the inner sleeve and the more effectively leakage between the sealing surface of the sealing element and the inner sleeve is counteracted. This is particularly advantageous when the differential pressure across the seal is great, that is when the sleeve valve is in a closed position and the pressure outside the outer sleeve is high whilst the pressure inside the inner sleeve is low, or vice versa.

The connection between the pressure chamber and the pressure sources may consist of ducts or slots that can be configured in different ways. These ducts or slots are preferably provided with at least one one-way seal that essentially only permits propagation of pressurised fluid from the pressure source to the pressure chamber.

The sleeve valve may be of a type where the inner sleeve is movable relative to the outer sleeve in that it is rotatable about the longitudinal direction of the tubing, the inner sleeve may be slidable in the longitudinal direction of the tubing, or a combination of both, for example, the inner sleeve may be movable relative to the outer sleeve along a helical path in the longitudinal direction of the tubing. The outer sleeve may have one or more openings that correspond with corresponding openings in the inner sleeve. The inner sleeve can be moved by using a remote-controlled tool that is powered by an electric or hydraulic motor, for example, via coiled tubing or electric cables. Alternatively, the inner sleeve can be moved via a drill string. In both cases, the movement can be transmitted to the inner sleeve via a gripping tool having clamping jaws that are actuated electrically or hydraulically. The movement of the inner sleeve can also be produced by means that are integral parts of the sleeve valve, for example, hydraulic cylinders. In addition to being movable between positions where the outer sleeve openings are aligned or misaligned with openings in the inner sleeve, the inner sleeve can also be movable to intermediate positions, so as to enable the fluid flow to be controlled to intermediate positions between closed and fully open flow. The outer sleeve openings may be arranged in rows along the outer sleeve, and be arranged symmetrically around the outer sleeve. Thus, the invention is not dependent upon how the sleeve valve is designed in other respects.

The invention also relates to a method for the assembly of a sleeve valve comprising an outer sleeve having at least one opening equipped with a device according to the invention, where the outer sleeve and the inner sleeve are produced separately. According to the invention, a sealing element and a tension element are placed in the outer sleeve opening, with the tension element disposed between corresponding bearing portions on the sealing element and the outer sleeve, which causes the sealing element with its sealing surface to project beyond the inner surface of the outer sleeve. A clamping tool with clamping jaws adapted to the opening in the sealing element is placed outside the outer sleeve opening, and the clamping jaws are inserted into the sealing element opening and clamped against the inner surface of the sealing element opening. The clamping jaws with the clamped sealing element are then moved outwards in the outer sleeve opening until the sealing surface of the sealing element is essentially flush with or projects beyond the inner surface of the outer sleeve, whereupon the inner sleeve is inserted into the outer sleeve, the clamping jaws with the clamped sealing element are moved inwards in the outer sleeve opening until the sealing surface of the sealing element rests against the inner sleeve, and the clamping jaws are released from the sealing element and the clamping tool is removed.

BRIEF DESCRIPTION OF THE DRAWINGS

The invention will now be described in more detail in connection with a description of a specific embodiment, and with reference to the drawings, wherein:

FIG. 1 shows a section through a seabed 45 with underlying rocks. A hydrocarbon reservoir 4 is located beneath an impermeable mantle rock 46.

DETAILED DESCRIPTION OF THE PREFERRED EMBODIMENTS

Figure 1:
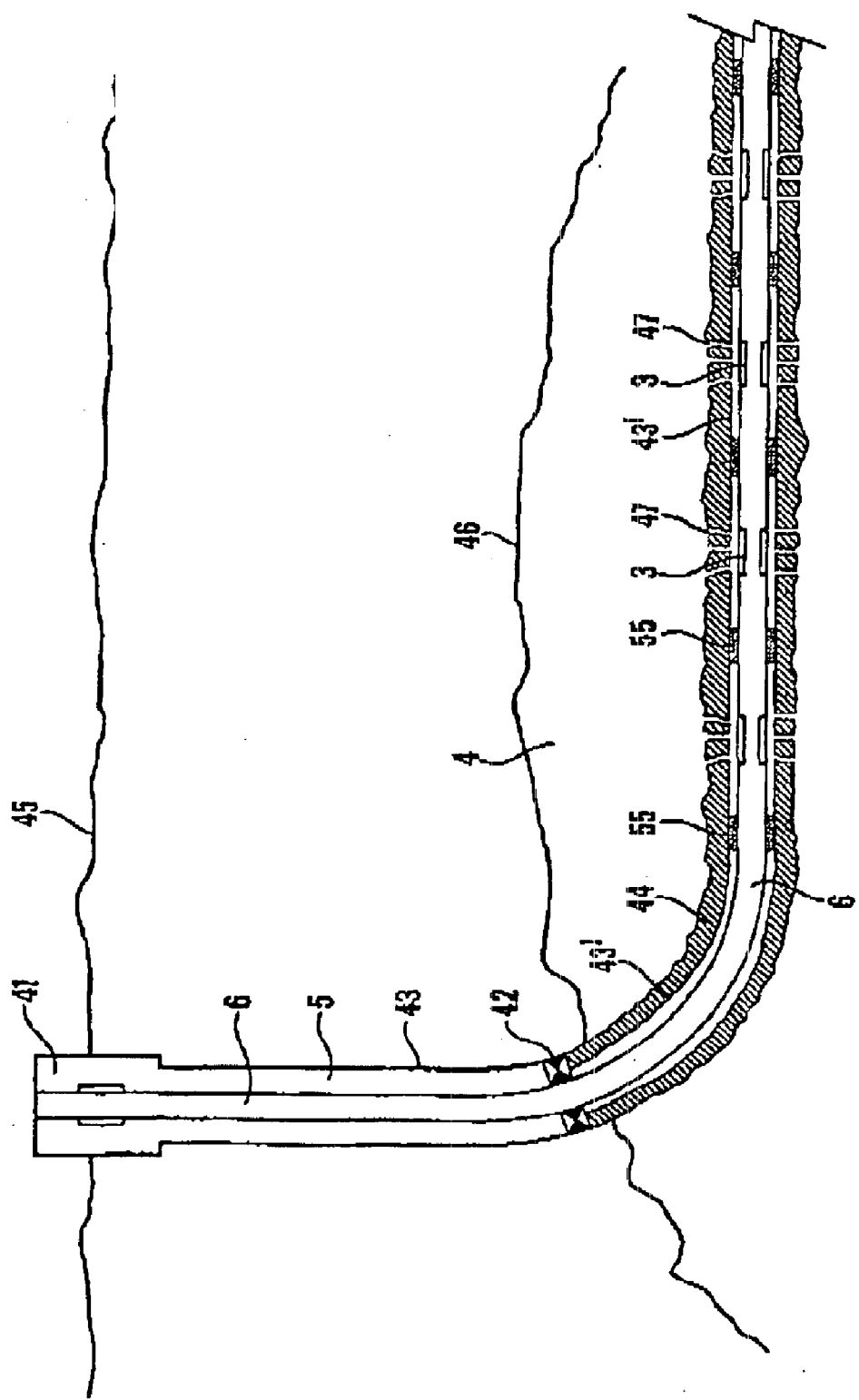
FIG. 1 shows a petroleum reservoir with a well.

A well 5 has been drilled from the seabed 45 down to and into the hydrocarbon reservoir 4. The part of the well 5 that is outside the reservoir 4 is lined with a casing 43, and inside the well the reservoir is lined with a casing 43' in order to prevent the well 5 from caving in. The space between the wall of the drilled well and the casing 43' inside the reservoir 4 is filled with concrete 44. Disposed within the casing is a tubing 6 that extends from a wellhead 41 on the seabed 45 into the reservoir 4. Perforations 47 in the concrete 44, which perforations can be made by firing projectiles through the concrete, permit fluids in the reservoir 4 to flow through the concrete 44 and the wall of the casing 43' and into the space between the casing 43' and the tubing 6. A production packer 42 disposed between the casing 43' and the tubing 6 prevents fluids in the reservoir 4 from flowing up in the well 5 between the casing 43 and the tubing 6.

The production conditions in the reservoir 4, that means primarily the amount of oil, gas and water and the pressure in the reservoir, vary along the tubing 6, and will alter during the course of the production time. To be able to control production from the well 5 along the tubing 6, that is to say control the inflow of oil, gas and water in the tubing 6, the reservoir 4 is divided into different production zones which may have very different pressure. The production zones are separated from one another by isolation packers 55 that are positioned between the casing 43' and the tubing 6 and prevent fluids from leaking between the production zones.

The tubing 6 extends through the different production zones, and has a sleeve valve 3 in each production zone. When a sleeve valve 3 is open, fluids are permitted to flow from the reservoir 4 in the respective production zone into the tubing 6 and up to the wellhead 41 for further treatment. The opening or closing of the different sleeve valves 3 will allow hydrocarbons to be produced from one or more production zones, whilst other production zones may be closed.

Figure 2:
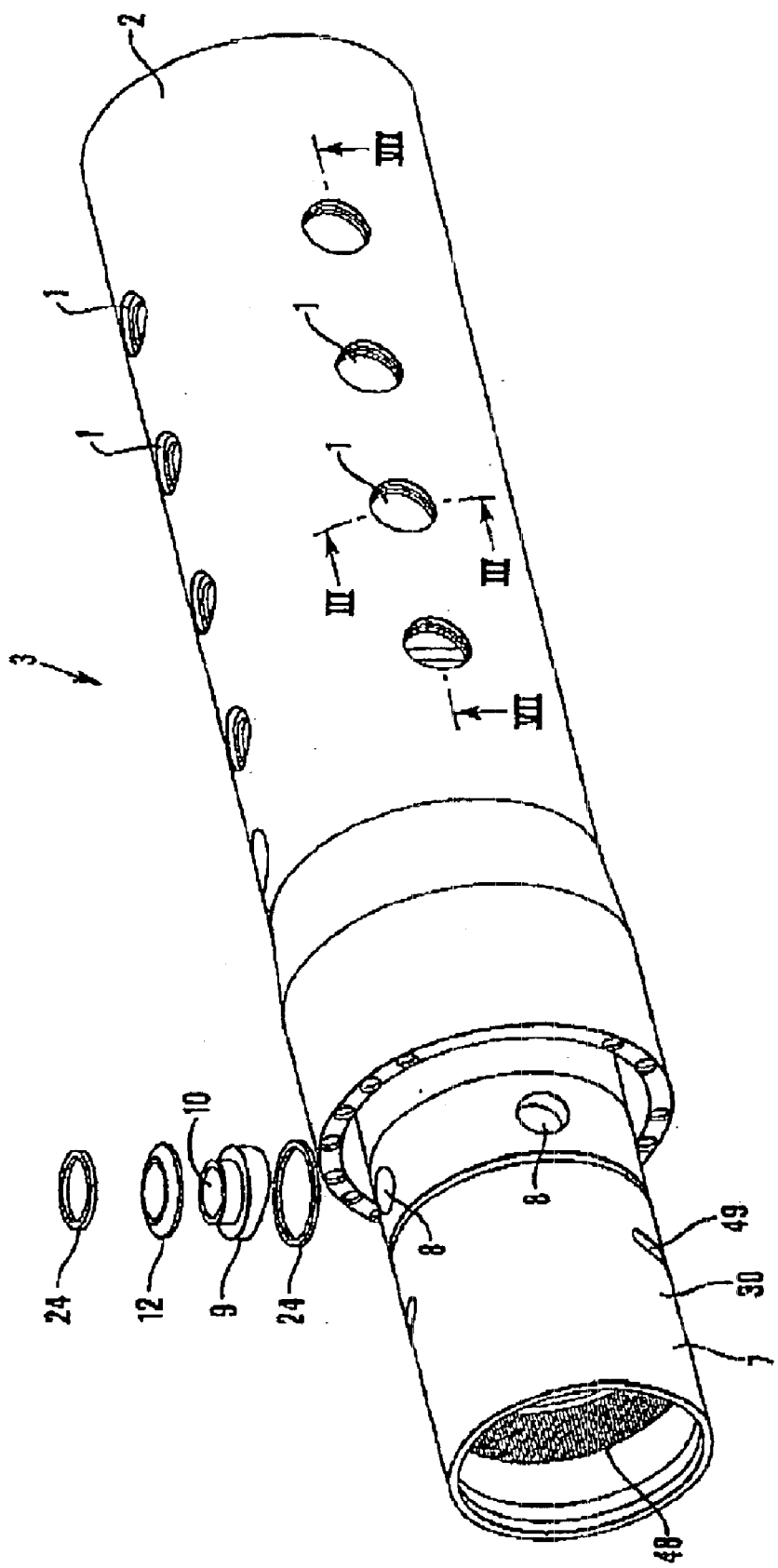
FIG. 2 shows a sleeve valve with an outer sleeve that has openings according to the invention.

FIG. 2 shows a sleeve valve 3 with an outer sleeve 2 that has openings 1 according to the invention. The outer sleeve 2 is fixed and forms a part of the tubing 6, which is not shown in FIG. 2. A movable inner sleeve 7, which is shown partly outside the outer sleeve 2, is disposed within the outer sleeve 2 when the sleeve valve 3 is assembled. Non-illustrated pins inside the outer sleeve 2 interact with a guide groove 49 in the inner sleeve 7, so as to prevent the inner sleeve 7 from sliding out of the outer sleeve. The inner sleeve 7 is provided with internal grooves 48 that can be gripped by an actuator or a tool in order to rotate the inner sleeve 7 between positions in which the outer sleeve openings 1 are aligned or misaligned with openings 8 in the inner sleeve 7 in order to admit or shut off the fluid flow from the reservoir to the interior of the inner sleeve 7. The inner sleeve 7 is open at its ends, and the fluids can therefore flow on freely in the tubing 6.

Figure 3:
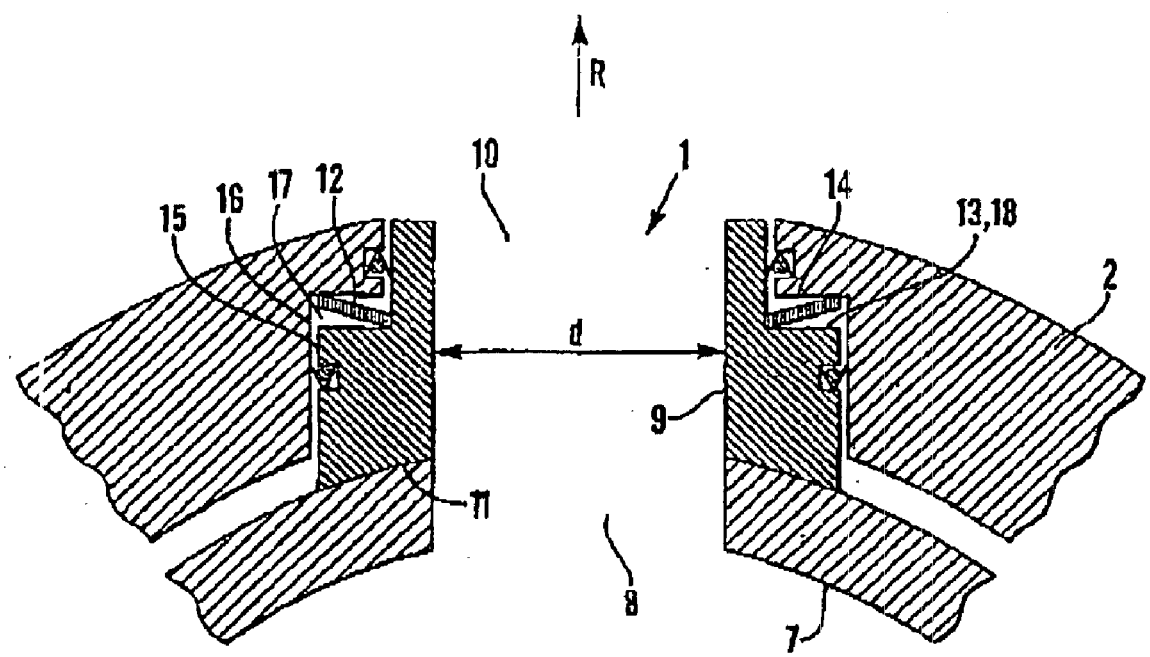
FIG. 3 is sectional view through an opening in the outer sleeve in FIG. 2, taken along the line III—III, where the sleeve valve is in an open position.

FIG. 3 shows a cross-section through an opening 1 in the outer sleeve 2 in FIG. 2, in an open position, where it can be seen that the outer sleeve opening 1 is aligned with the inner sleeves 7 opening 8. The outer sleeve opening 1 is provided with a sealing element 9 that is movable away from and towards the inner sleeve 7 in a radial direction R or the opposite of R. The sealing element 9 has a through-going radial opening 10 that is adapted to correspond with the inner sleeve opening 8. The part of the sealing element 9 facing the inner sleeve 7 has around the through opening 10 an encircling sealing surface 11 that is adapted to rest against the inner sleeve 7 around the inner sleeve opening 8.

A tension element 12 is arranged between bearing portions 13 on the sealing element 9 and corresponding bearing portions 14 on the outer sleeve 2, and presses the sealing element 9 with its sealing surface 11 against the inner sleeve 7. A seal is thus obtained in the sleeve valve 3. However, this seal has little importance in the open position of the sleeve valve 3, where the very intention is that fluids should pass through the sleeve valve.

Figure 4:
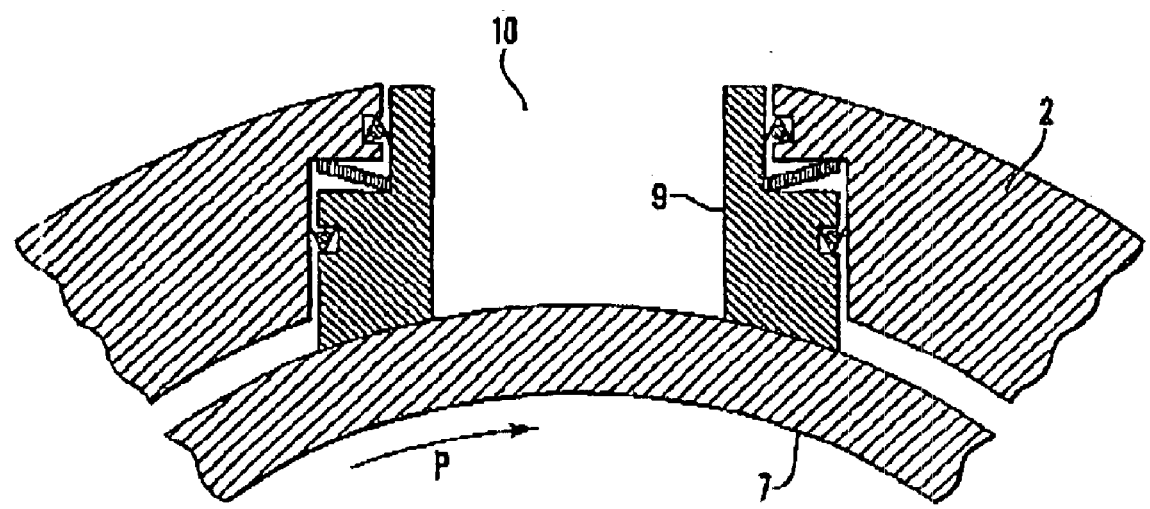
FIG. 4 is a sectional view through an opening in the outer sleeve in FIG. 2, taken along the line III—III, where the sleeve valve is in the closed position.

FIG. 4 shows the same opening 1 in the outer sleeve as that shown in FIG. 3, in the closed position, which has been reached in that the inner sleeve 7 has been rotated in the direction P until the inner sleeve opening 8 is misaligned with the outer sleeve opening 1 and the opening 10 of the sealing element.

In the closed position, the leak-tightness of the sleeve valve is of major importance, as fluids that leak in between the outer sleeve and the inner sleeve will find their way into the tubing 6. As discussed in the general part of the description, the sleeve valves can, in a closed position, be subjected to substantial differential pressures which, apart from having the potential themselves to cause leakage, may also lead to great deformation of the sleeve valves, which may cause the sleeve valves to leak in the closed position.

Figure 5:
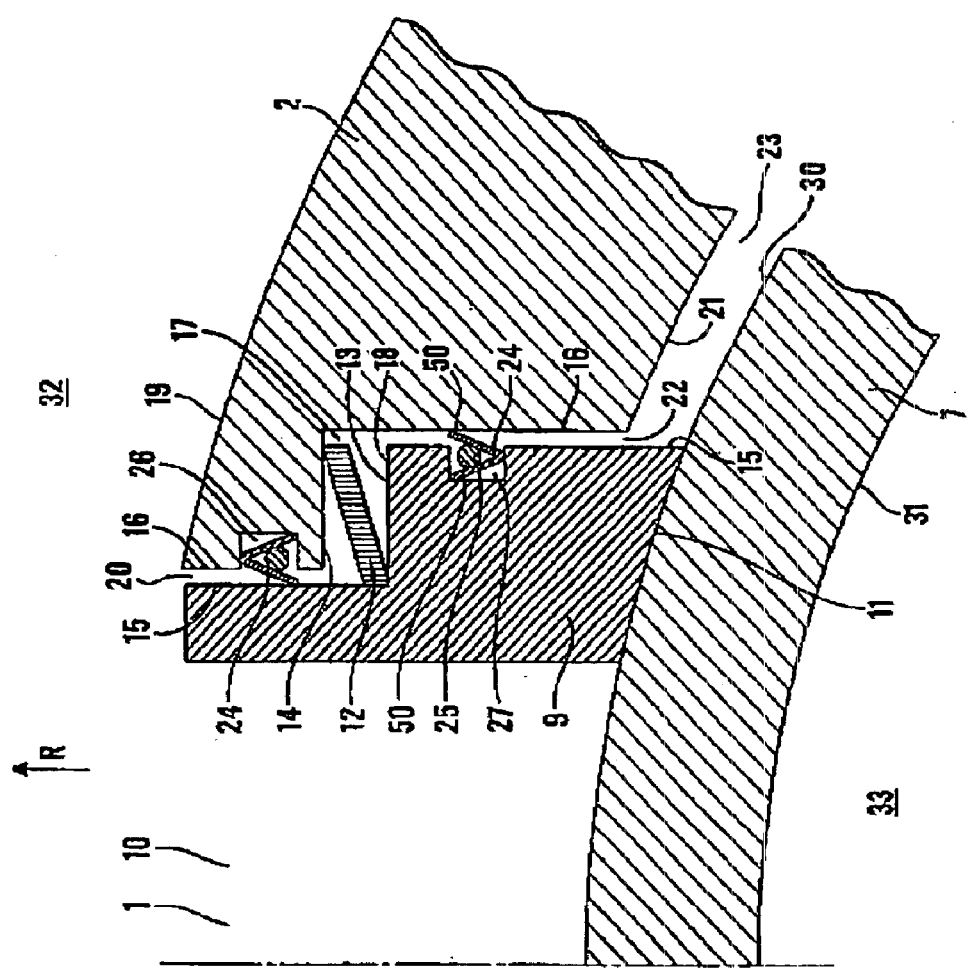
FIG. 5 is an enlarged section of FIG. 4.

FIG. 5 shows an enlarged section of FIG. 4, where details are easier to see. The movability of the sealing element 9 in the direction R and in the opposite of R is provided in that the sealing element 9 has a side face 15 that is adapted to the side face 16 of the outer sleeve opening 1. Disposed between the side face 15 of the sealing element and the side face 16 of the outer sleeve opening is a pressure chamber 17 where a portion of the side face 15 of the sealing element forms a pressure face 18 which under the effect of pressure in the pressure chamber 17 presses the sealing element 9 against the inner sleeve 7. The sealing surface 11 of the sealing element is thus pressed against the inner sleeve with a force which, apart from being dependent upon the force from the tension element 12, is also dependent upon the size of the pressure face 18 and the pressure in the pressure chamber 17. The side face 15 of the sealing element should be understood as the whole side of the sealing element 9, from the sealing surface 11 to the side of the sealing element 9 that is at the outer surface 19 of the outer sleeve 2, whilst the side face 16 of the outer sleeve should be understood as the whole side of the opening 1 from the inner surface 21 of the outer sleeve to the outer surface 19 of the outer sleeve. The almost rectangular shape of the pressure chamber 17 that is shown in FIGS. 3–5, with a flat pressure face 18 that is perpendicular to the direction of motion R, is only one of a number of possible shapes of the pressure chamber 17, the essential feature being that the side face 15 of the sealing element forms a pressure face 18 which, when subjected to pressure, presses the sealing element 9 against the inner sleeve 7. The pressure face 18 could have been oblique or rounded, and it could have had a surface that is not flat, which would not have had any impact on the effect of the pressure in the pressure chamber 17.

The pressure chamber 17 is via at least one connection connected to at least one pressure source. In the illustrated embodiment, the pressure chamber 17 is connected to two pressure sources, one of which consists of the pressure in an area 32 outside the outer sleeve 2, whilst the other consists of the pressure in an area 33 inside the inner sleeve 7.

The connection between the pressure chamber 17 and the pressure in the area 32 outside the outer sleeve 2 consists of an outwardly directed slot 20 from the pressure chamber 17 to the outer surface 19 of the outer sleeve 2. The outwardly directed slot 20 is defined by the side face 15 of the sealing element and the side face 16 of the outer sleeve opening.

The connection between the pressure chamber 17 and the pressure in the area 33 inside the inner sleeve 7 consists of an inwardly directed slot 22 that is defined by the side face 15 of the sealing element and the side face 16 of the outer sleeve opening, which slot 22 extends from the pressure chamber 17 to a slot or duct 23 between the inner surface 21 of the outer sleeve and the outer surface 30 of the inner sleeve. A non-illustrated connection runs on from the slot 23 to the area 33 inside the inner sleeve 7. This last-mentioned connection may consist of a slot or duct from the outer surface 30 of the inner sleeve to the inner surface 31 of the inner sleeve, but it can also consist of the opening 8 in the inner sleeve, which is a simpler embodiment.

To ensure a suitable dimension of the slots 20 and 22, at the same time as the sealing element 9 has a controlled radial movability in the direction R and the opposite of R in the outer sleeve opening 1, the slots 20, 22 can be designed as one or more radial grooves or recesses in the side face 15 of the sealing element or the side face 16 of the outer sleeve opening. The connections from the pressure chamber 17 to the outer surface 19 of the outer sleeve and the inner surface 21 of the outer sleeve can also, in a non-illustrated embodiment, be made in the form of ducts through the outer sleeve 2 or the sealing element 9.

The connections between the pressure chamber 17 and the pressure sources 32, 33 permit pressure propagation from the pressure sources 32, 33 to the pressure chamber 17, which causes the sealing element 9 with its sealing surface 11 to be pressed even more against the inner sleeve 7.

The greater the pressure in the area 32 outside the outer sleeve 2, that is to say in the reservoir 4, and/or in the area 33 inside the inner sleeve 7, that is to say, in the tubing 6, the more forcefully the sealing surface 11 of the sealing element will be pressed against the inner sleeve 7. As mentioned, this is particularly advantageous when there is a large differential pressure and when the sleeve valve is closed.

The connections between the pressure chamber 17 and the pressure sources 32, 33 preferably comprise at least one one-way seal 24 that essentially only allows propagation of pressurised fluid from the pressure sources 32, 33 to the pressure chamber 17. The one-way seals 24 prevent any appreciable fluid flow out of the pressure chamber 17, and thus prevent flow between the pressure sources 32, 33 which, when the sleeve valve is closed, would be tantamount to leakage through the sleeve valve.

Each one-way seal 24 may advantageously consist of a double, V-shaped lip seal, see FIG. 5, which comprises two lips 50 that are joined as a V. The one-way seal 24 is arranged between the pressure chamber 17 and the pressure source 32 and 33 respectively, with the tip of the V, where the two lips 50 are joined, pointing towards the pressure source. A central member 25 in the one-way seat 25 holds the lips 50 essentially in place. The lips 50, which may be made of a synthetic stiff, elastic material, are deformed elastically and squeezed together when there is an overpressure on the side of the pressure source, so that pressurised fluid passes the seal and enters the pressure chamber 17. However, an overpressure on the side of the pressure chamber 17 causes the lips 50 to be squeezed against the side face 15 of the sealing element and the side face 16 of the outer sleeve opening, so that fluid is prevented from flowing past the seal 24 away from the pressure chamber 17. It will be seen that the outer sleeve 2 and the sealing element 9 are provided with recesses 26 and 27 respectively for the one-way seats 24. The function of the recesses 26, 27 is to provide room for the one-way seals 24 and prevent them from shifting inside the slots 20, 22.

From FIGS. 3–5 it can be seen that the tension element 12 is placed in the pressure chamber 17, and that the tension element 12 bearing portions 13 and 14 of the sealing element and the outer sleeve consist of portions of the side face 15 of the sealing element and the side face 16 of the outer sleeve opening 1, which at the same time form the pressure chamber 17. This makes for a rational production of the components of the sleeve valve.

Reverting to FIG. 2, it will be seen that the sealing element 9, the tension element 12 and the one-way seals 24 in this embodiment of the invention are all circular. Consequently, the pressure chamber 17, the pressure face 18 and the recesses 26, 27 in this embodiment are also circular, and extend along the whole circumference of the outer sleeve opening 1 and the sealing element 9. The tension element 12, which must be capable of producing a great force in the radial direction R, is made of a tension ring of steel. When unloaded, the tension ring 12 is conical in shape. When squeezed together in the radial direction R, the tension ring is deformed elastically and becomes flatter in shape, which produces the force of the tension ring against the sealing element 9.

In a non-illustrated embodiment, the opening 10 in the sealing element can be adapted to choke the flow through the outer sleeve opening 1 and the inner sleeve opening 8 to a desired value. This can be accomplished by selecting a suitable internal diameter d for the opening 10 in the sealing element, see FIG. 3, as the opening 10 in the sealing element, in order to obtain a choking effect, must be smaller than the outer sleeve and inner sleeve openings 1 and 8 respectively. The installation of sealing elements having suitable openings, in some cases possibly sealing elements without openings, will allow a standard sleeve valve having a given number of openings in the outer sleeve, for example, 20 openings, to be used if it is desirable to have a certain choking of the inflow from the reservoir 4 to the tubing 6, and where it would in fact have been sufficient to use a sleeve valve with a smaller number of openings in the outer sleeve.

Although FIG. 2 may give the opposite impression, the sealing element 9 described with reference to FIGS. 2–5, must be inserted into the outer sleeve opening 1 from the inside of the outer sleeve, as the sealing element 9 is larger than the outer sleeve opening 1. This means that the sealing element 9 must be inserted into the outer sleeve before the inner sleeve 7. However, the tension element 12 presses the sealing element 9 inwards in the direction opposite to R, see FIG. 5, and when the inner sleeve 7 is not inside the outer sleeve 2, the sealing element 9 will therefore project in so far that it prevents the inner sleeve 7 from being inserted into the outer sleeve 2.

In the method according to the invention, this problem is solved in that the outer sleeve 2 and the inner sleeve 7 are first made separately, for example, by machining tubes. During the installation of the inner sleeve in the outer sleeve, a sealing element 9 and a tension element 12 are placed in the opening 1 of the outer sleeve, with the tension element 12 arranged between corresponding bearing portions 13, 14 on the sealing element 9 and the outer sleeve 2 respectively, see FIG. 5. The sealing element 9 with its sealing surface 11 thus projects beyond the inner surface 21 of the outer sleeve.

Figure 6:
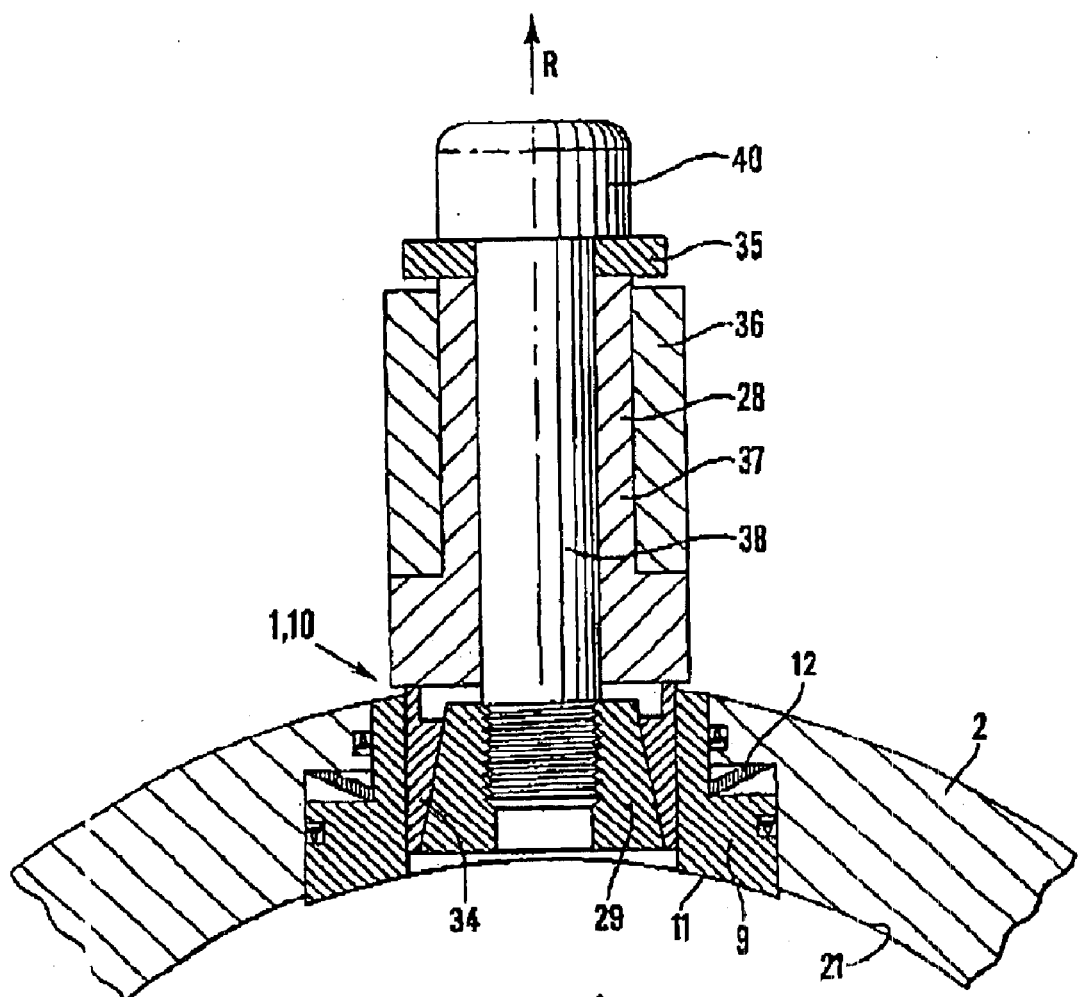
FIG. 6 is a sectional view through an opening in an outer sleeve according to the invention, corresponding to the line III—III in FIG. 2, with a clamping tool for use in connection with a method according to the invention.

Subsequently, with reference to FIG. 6, a clamping tool 28 having clamping jaws 29, 34 adapted to the opening 10 in the sealing element is positioned outside the outer sleeve opening 1, and the clamping jaws 29, 34 are inserted into the opening 10 in the sealing element and clamped against the inner surface of the sealing element opening 10. With the illustrated tool, this is done in that the inner and outer clamping jaws 29, 34 are conical. The clamping jaw 34 consists of several segments which at their end rest against a sleeve 37, which via a washer 35 rests against a screw head 40 on a tightening screw 38. When the tightening screw 38 is tightened, interacting threads on the tightening screw 38 and the inner clamping jaw 29 cause the clamping jaw 29 to be drawn inside the clamping jaw 34, which because of the conical shape of the clamping jaws causes the segments in the clamping jaw 34 to be pressed against the inner surface of the opening 10 in the sealing element. The sealing element 9 is thus held in the clamping tool 28.

Figure 7:
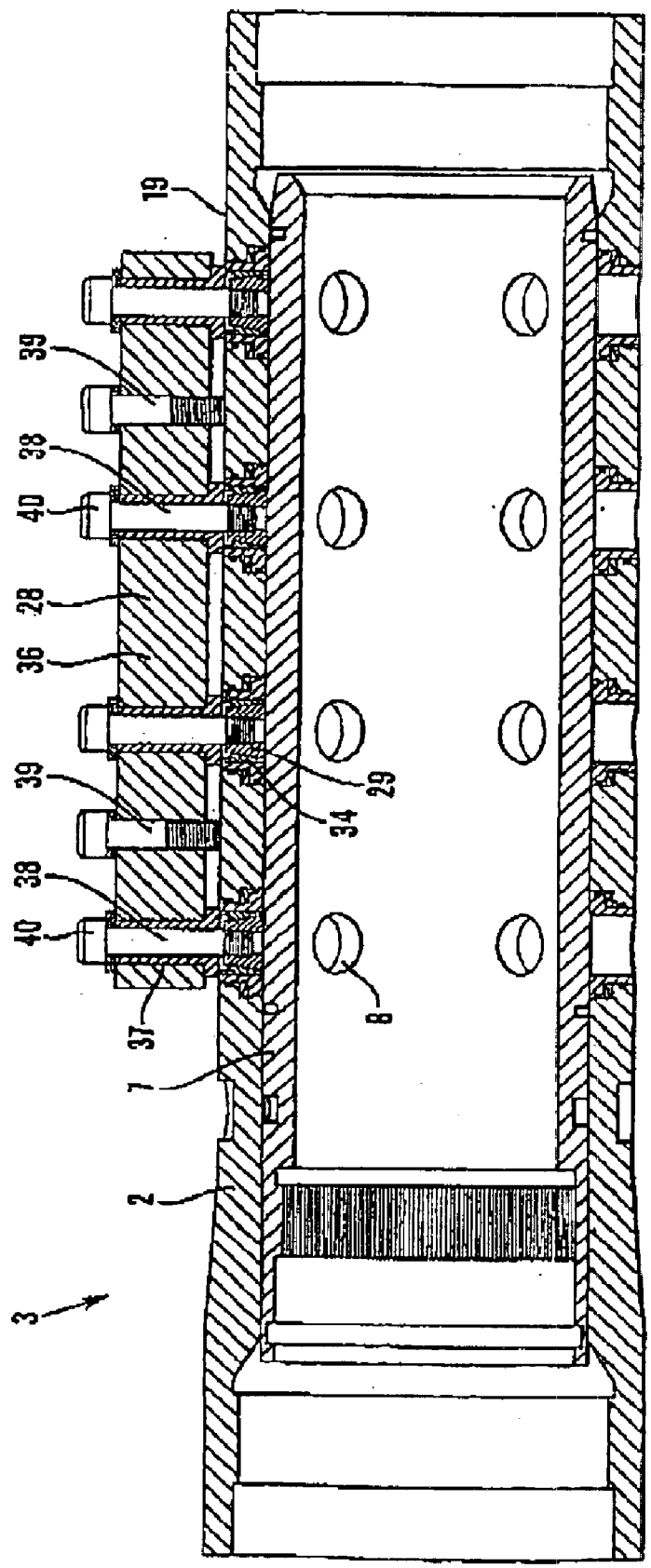
FIG. 7 is a longitudinal section through an opening in an outer sleeve according to the invention, corresponding to the line VII—VII in FIG. 2, with a clamping tool for use in connection with the method according to the invention.

The clamping jaws 29, 34 and the clamped sealing element 9 are then moved outwards in the outer sleeve opening 1 in the direction R until the sealing surface 11 of the sealing element is essentially flush with or projects beyond the inner surface 21 of the outer sleeve. With reference to FIG. 7, which shows a longitudinal section through a sleeve valve where the inner sleeve 7 is mounted inside the outer sleeve 2, this is done in that sleeves 37 for several tightening screws 38 are held in a common block 36. Positioning screws 39 that are in engagement with threads in the block 36 rest against the outer surface 19 of the outer sleeve 2, and the tightening of the positioning screws 39 causes the block 36 and the sleeves 37, the tightening screws 38 and the clamping jaws 29, 34, and the sealing element 9, to be pressed away from the outer sleeve 2 in the direction R (see FIG. 6), which results in the sealing surfaces 11 of the sealing elements, after the positioning screws 39 have been tightened a little, being essentially flush with or projecting beyond the inner surface 21 of the outer sleeve.

Space is thus made for the insertion of the inner sleeve 7 in the outer sleeve 2, and the inner sleeve 7 is then inserted into the outer sleeve 2. The clamping jaws 29, 34 with the clamped sealing element 9 are then moved inwards in the outer sleeve opening 1 until the sealing surface 11 of the sealing element rests against the inner sleeve 7. With the illustrated tool 28, this is done by loosening the positioning screws 39 so that the block 36 with the sleeves 37 moves towards the outer sleeve 2, and the tightening screws 38 with the clamping jaws 29, 34 and the sealing element 9 are again moved inwards in the outer sleeve opening 1, until the sealing surface 11 of the sealing element rests against the inner sleeve 7.

The clamping jaws 29, 34 are then loosened from the sealing element 9, and the clamping tool 28 is removed.

Figure 8:
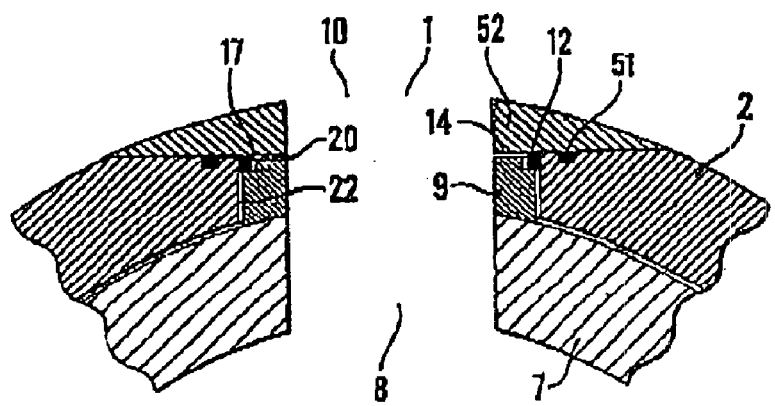
FIG. 8 is a sectional view through a second embodiment of an opening in an outer sleeve according to the invention, taken along the line VIII—VIII in FIG. 9, where the sleeve valve is in an open position.

FIG. 8 shows a cross-section through a second embodiment of an opening 1 in an outer sleeve 2 according to the invention, in an open position. As in the embodiment described above, a sealing element 9 is pressed by means of a tension element 12 against the inner sleeve 7. Slots 20, 22 convey pressurised fluid to a pressure chamber 17, which causes the sealing element 9 to be pressed even more against the inner sleeve 7. In this embodiment, however, the portion of the outer sleeve 2 that is around the outer portion of the outer sleeve opening 1, and which comprises the outer sleeve's bearing portion 14 for the tension element 12, consists of a removable cover 52. A sealing ring 51 provides a seal between the cover 52 and the outer sleeve 2.

Figure 9:
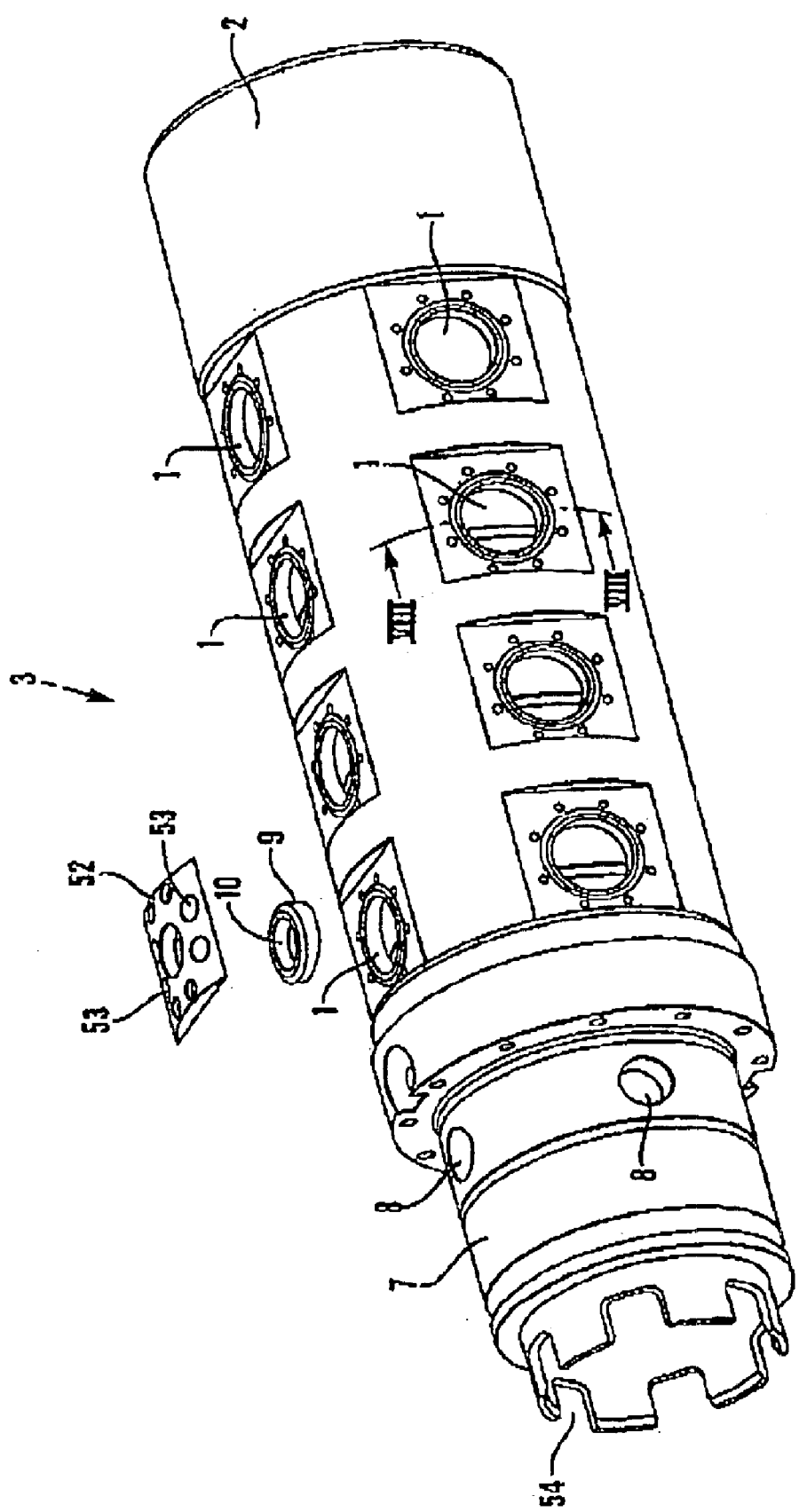
FIG. 9 shows a sleeve valve with an outer sleeve that has openings according to the embodiment shown in FIG. 8.

FIG. 9 shows a sleeve valve 3 having an outer sleeve 2 which has openings 1 that are designed as shown in FIG. 8, where the covers 52 have been taken off. The inner sleeve 7, which by means of a grip portion 54 can be gripped and rotated by a suitable tool, is in the process of being inserted into the outer sleeve 2. The sealing elements 9 can in this embodiment be inserted into the outer sleeve openings 1 from the outside, after the inner sleeve 7 has been put in place, and the problem described above relating to the insertion of the sealing elements, and which can be solved by using the tool shown in FIGS. 6 and 7, is not present in the embodiment shown in FIG. 9. A sealing element 9 with its opening 10 is shown between an opening 1 in the outer sleeve and a cover 52. The cover 52 can by means of non-illustrated screws through screw holes 53 be screwed in place on the outer sleeve 2 and press the sealing element 9 and a non-illustrated tension element into the opening 1 in the outer sleeve, so that the sealing element 9 is pressed against the inner sleeve 7.

What is claimed is:

1. A device for an opening in an outer sleeve that is a part of a sleeve valve for fluid flow between a hydrocarbon reservoir and a well in the hydrocarbon reservoir, where the well comprises a tubing, where the outer sleeve is fixed and forms a part of the tubing, and the sleeve valve further comprises a movable inner sleeve which by means of an actuator or a tool is movable between positions in which the opening in the outer sleeve is aligned or misaligned with an opening in the inner sleeve, in order to admit or shut off the fluid flow, the device comprising:

the outer sleeve opening being provided with a radially movable sealing element having a through-going radial opening adapted to correspond with the inner sleeve opening and having an encircling sealing surface that is adapted to rest against the inner sleeve around the opening in the inner sleeve;

a tension element being arranged between corresponding bearing portions on the sealing element and the outer sleeve respectively, and presses the sealing element with its sealing surface against the inner sleeve;

disposed between the side face of the sealing element and the side face of the outer sleeve opening is a pressure chamber where a portion of the side face of the sealing element forms a pressure face which under the effect of pressure in the pressure chamber presses the sealing element against the inner sleeve; and the pressure chamber via at least one connection is connected to at least one pressure source, whereby propagation of pressure from the pressure source to the pressure chamber causes the sealing element with its sealing surface to be pressed even more against the inner sleeve.

2. The device according to claim 1, wherein one of the pressure sources consists of the pressure in an area outside the outer sleeve.

3. The device according to claim 2, wherein the connection between the pressure chamber and the pressure in the area outside the outer sleeve consists of an outwardly directed slot between the side face of the sealing element and the side face of the outer sleeve opening.

4. The device according to claim 1, wherein one of the pressure sources consists of pressure in an area inside the inner sleeve.

5. The device according to claim 4, wherein the connection between the pressure chamber and the pressure in the area inside the inner sleeve comprises an inwardly directed slot between the side face of the sealing element and the side face of the outer sleeve opening, which slot is arranged from the pressure chamber to a slot or duct between the inner surface of the outer sleeve and the outer surface of the inner sleeve, and a further connection to the area inside the inner sleeve.

6. The device according to claim 1, wherein at least one of the connections between the pressure chamber and the at least one pressure source comprise at least a one one-way seal which essentially only permits propagation of pressurised fluid from the at least one pressure source to the pressure chamber.

7. The device according to claim 6, wherein the one-way seal consists of a double V-shaped lip seal.

8. The device according to claim 6, wherein at least one of the outer sleeve and the sealing element is provided with recesses for the one-way seal.

9. The device according to claim 1, wherein the tension element is located in the pressure chamber.

10. The device according to claim 1, wherein the tension element consists of a tension ring which, when loaded in a radial direction, is deformed elastically.

11. The device according to claim 1, wherein the opening in the sealing element is adapted to choke the flow though the outer sleeve opening and the inner sleeve opening to a given value.

12. A method for the assembly of a sleeve valve comprising an outer sleeve having at least one opening equipped with a device, wherein the outer sleeve and the inner sleeve are produced separately, said method comprising the following steps of:

placing a sealing element and a tension element in the opening in the outer sleeve, with the tension element arranged between corresponding bearing portions on the sealing element and the outer sleeve, which causes the sealing element with its sealing surface to project beyond an inner surface of the outer sleeve;

placing a clamping tool with clamping jaws adapted to the opening in the sealing element outside the opening in the outer sleeve, and the clamping jaws being inserted into the opening in the sealing element and clamped against an inner surface of the sealing element opening;

moving the clamping jaws with the clamped sealing element outwards in the outer sleeve opening until the sealing surface of the sealing element is essentially flush with or projects beyond the inner surface of the outer sleeve;

inserting the inner sleeve into the outer sleeve;

moving the clamping jaws with the clamped sealing element inwards in the opening in the outer sleeve until the sealing surface of the sealing element rests against the inner sleeve; and loosening the clamping jaws from the sealing element and removing the clamping tool.

* * * * *